(12) United States Patent  (10) Patent No.: US 7,782,344 B2
Whittaker  (45) Date of Patent: Aug. 24, 2010

(54) DIGITAL VIDEO ZOOMING SYSTEM

(75) Inventor: David Whittaker, Watford (GB)

(73) Assignee: NDS Limited, Middlesex (GB)

( * ) Notice: Subject to any disclaimer, the term of this patent is extended or adjusted under 35 U.S.C. 154(b) by 205 days.

(21) Appl. No.: 12/084,539

(22) PCT Filed: Nov. 15, 2005

(86) PCT No.: PCT/IL2005/001205

§ 371 (c)(1), (2), (4) Date: Jun. 11, 2008

(87) PCT Pub. No.: WO2007/057875

PCT Pub. Date: May 24, 2007

(65) Prior Publication Data

US 2008/0266458 A1  Oct. 30, 2008

(51) Int. Cl.
*G06T 15/00* (2006.01)
(52) U.S. Cl. .................. 345/660; 345/619; 345/632; 348/170; 348/582; 382/298
(58) Field of Classification Search ............... 345/619, 345/632, 660; 348/208.14, 169, 170, 171, 348/581, 582; 382/298
See application file for complete search history.

(56) References Cited

U.S. PATENT DOCUMENTS

| | | | |
|---|---|---|---|
| 6,400,852 B1 | 6/2002 | Miller, II et al. | |
| 6,542,201 B1 | 4/2003 | Song et al. | |
| 6,934,423 B1 | 8/2005 | Clapper | |
| 7,142,251 B2 | 11/2006 | Sha et al. | |
| 7,522,189 B2 * | 4/2009 | Chiba | 348/208.6 |
| 2003/0214603 A1 | 11/2003 | Manning | |
| 2004/0006767 A1 | 1/2004 | Robson et al. | |
| 2005/0151884 A1 | 7/2005 | Oh | |
| 2005/0151885 A1 | 7/2005 | Choi | |

FOREIGN PATENT DOCUMENTS

| | | |
|---|---|---|
| EP | 0 677 842 A1 | 10/1995 |
| WO | WO 91/19390 | 12/1991 |
| WO | WO 02/37853 A1 | 5/2002 |
| WO | WO 2005/099413 A2 | 10/2005 |

OTHER PUBLICATIONS

Oct. 29, 2009 Extended search report in connection with EP 05 80 3701.1.
Oct. 23, 2009 WPI/Thomson Database printout XP-002551422.

* cited by examiner

*Primary Examiner*—Phu Nguyen
(74) *Attorney, Agent, or Firm*—Husch Blackwell Sanders LLP Wesh & Katz

(57) ABSTRACT

A system for preparing a digital video stream for zooming by a content consumer system, including a video frame processor to prepare a plurality of video frames of the digital video stream, a zoom location processor to prepare a plurality of zoom location indicators in the digital video stream, each of the zoom location indicators including an element indicative of a least one horizontal position and at least one vertical position in the video frames, and a stream processor to temporally synchronize the zoom location indicators and the video frames in the digital video stream, such that the video frames are available to be zoomed by the content consumer system based on the zoom location indicators during playback of the digital video steam. Related apparatus and methods are also described.

9 Claims, 7 Drawing Sheets

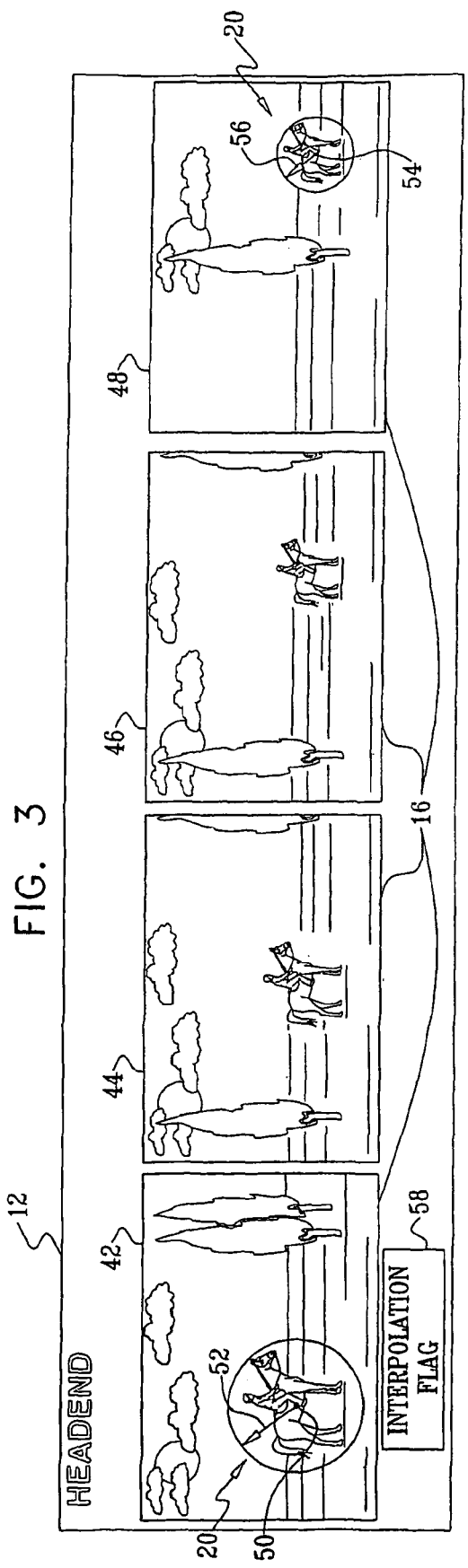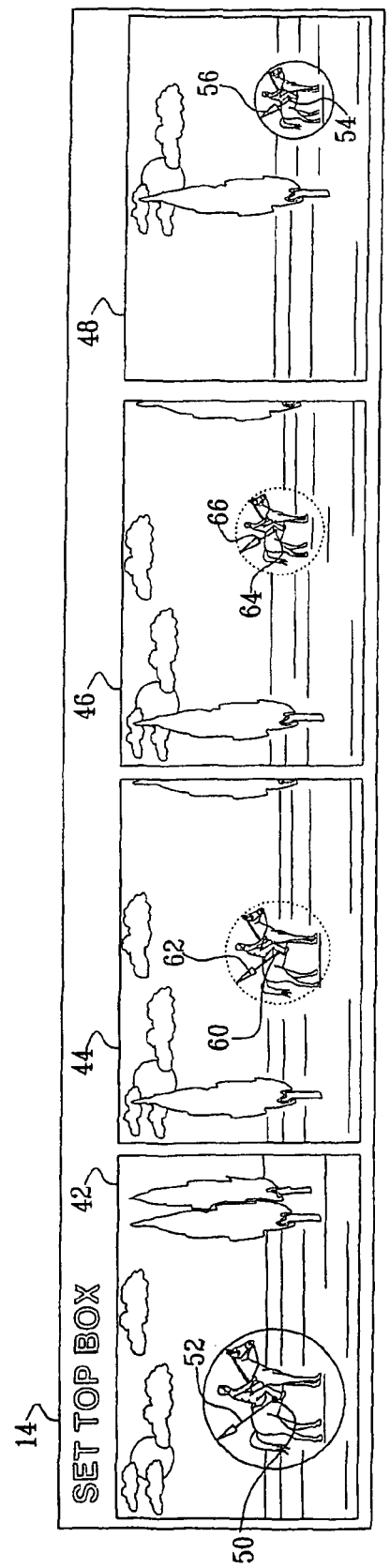
FIG. 3

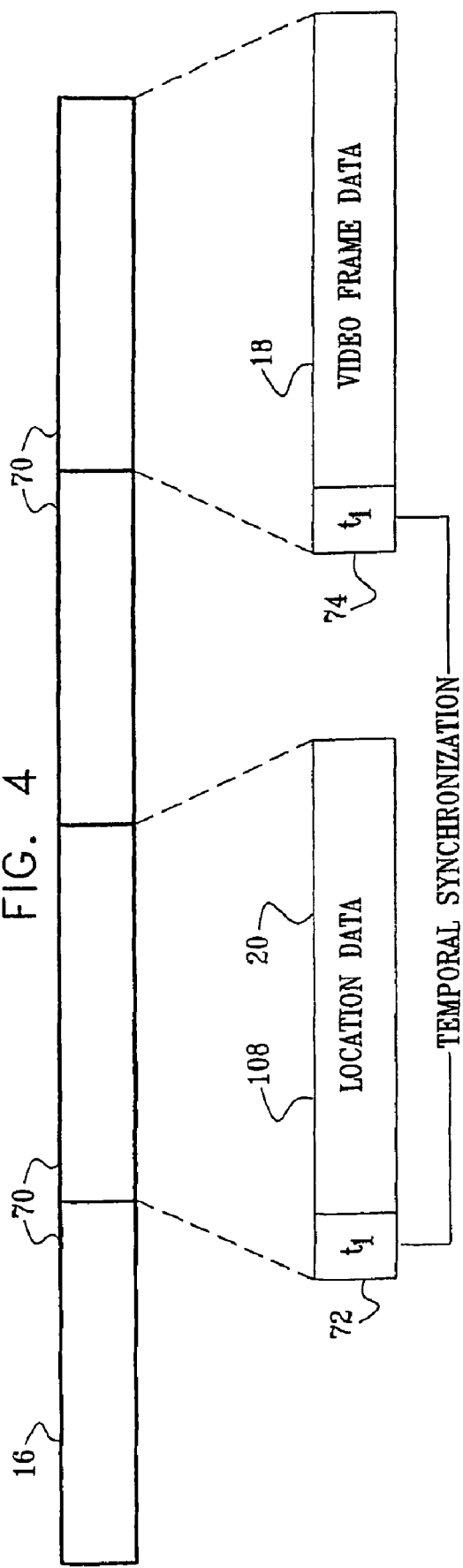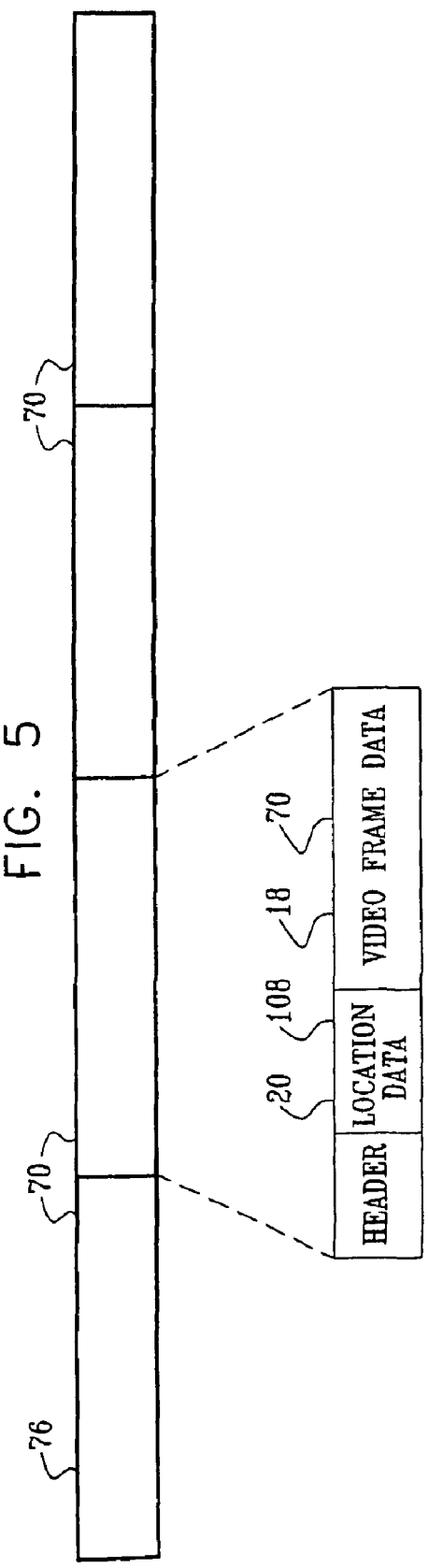

DIGITAL VIDEO ZOOMING SYSTEM

The present application is a 35 USC §371 application of PCT/IL2005/001205, filed on 15 Nov. 2005 and entitled "Digital Video Zooming System", which was published on 24 May 2007 in the English language with International Publication Number WO 2007/057875.

FIELD OF THE INVENTION

The present invention relates to a media system, and in particular image processing in media systems.

BACKGROUND OF THE INVENTION

By way of introduction, many broadcasters and regulators have demanded that TV broadcasts are made more accessible to viewers who have viewing or hearing difficulties. The demand has spurred the introduction of features, such as, subtitles (closed captions), "signed" broadcasts and audio description tracks.

Recently, the introduction of High Definition (HD) broadcasts and the increased interest in handheld TV reception devices have presented new challenges to content producers who have to produce and deliver images to differing types of displays with a significant range of visual resolution (perhaps 10:1 in the range of the pixel resolution of a HD display versus a handheld device).

A related challenge has been the display of widescreen film formats (such as 16:9) on standard definition (SD) format (4:3) TV displays. Early transmission systems simply prepared the content for delivery to a totally 4:3 audience by "pan and scan" in the studio as part of the telecine process of transferring feature films to video tape prior to transmission. An operator would select which part of the film image would be visible in the 4:3 "window".

Some TV transmission standards have considered delivering the original broadcast in widescreen mode and also carrying some basic metadata to control the left/right shift of the image for display on a compatible 4:3 display. However, the functionality has never been widely deployed.

In the field of computers, Microsoft Corp. introduced the Microsoft "Magnifier" used to assist visually impaired PC users see sections of the screen at a larger size. The level of zoom and the area for zooming is totally controlled by the user.

The following references are believed to represent the state of the art:

U.S. Pat. No. 6,400,852 to Miller, II et al.;
U.S. Pat. No. 6,542,201 to Song, et al.;
U.S. Pat. No. 6,934,423 to Clapper;
US Published Patent Application No. 2005/0151884 of Oh; and
US Published Patent Application No. 2005/0151885 of Choi.

The disclosures of all references mentioned above and throughout the present specification, as well as the disclosures of all references mentioned in those references, are hereby incorporated herein by reference.

SUMMARY OF THE INVENTION

The present invention seeks to provide an improved image processing system, for example, but not limited to, selected zooming and pixelization, in a media system.

The system of the present invention, in preferred embodiments thereof, includes a system whereby a content provider provides a content consumer system with a digital video stream including video frames and associated zoom location indicators so that the content consumer system can enlarge the video frame images based on the zoom location indicators, providing a form of dynamically managed "zoom".

Each zoom location indicator preferably includes an element which is indicative of a horizontal and vertical position in the video frames representing a center of a zoom target area. Each zoom location indicator preferably includes a length which is indicative of the magnitude of the zoom target area. The magnitude is typically expressed as a radius extending from the center of the zoom target area. The center and magnitude of the zoom target area are preferably measured in pixels.

The content provider typically specifies the center of each zoom target area as a coordinate point in the image which represents the focal point of the current shot, such as the head of a currently speaking actor, so that the content consumer system enlarges the image centered on the focal point.

The centre and magnitude of the zoom target area is generally updated periodically. The centre and magnitude of the zoom target area is typically constant across a plurality of video frames.

In accordance with a most preferred embodiment of the present invention, the digital video stream determines zoom location indicators for video frames, which do not have associated zoom location indicators in the digital video stream, by using an interpolation technique.

In accordance with the most preferred embodiment of the present invention, the data of the video frames and the zoom location indicators are not located in the same packets within the digital video stream. The video frame and the zoom location indicators are then associated with each other typically using temporal synchronization based on a time stamp of each packet.

In accordance with an alternative preferred embodiment of the present invention, each zoom location indicator is located within an associated video frame data packet.

The abovementioned zoom system may be implemented in any suitable media system, for example, but not limited to, a broadcasting system where the broadcast transport stream includes the video frames and associated zoom location indicators, and/or a non-volatile digital storage medium such that the recorded digital video stream includes video frames and associated zoom location indicators.

The zooming system can be used to help: viewers with visual disabilities; or viewers who are attempting to watch visually detailed broadcasts on lower resolution and/or smaller display devices (for example: HD images on SD TV or handheld devices; or SD TV on handheld devices) and who may find it difficult to properly see and/or perceive the primary details of a TV image, for example, but not limited to, who is speaking or which player has the ball.

It is known that media content can be restricted for certain viewers, for example, preventing children from viewing certain programs using parental control systems available in media devices such as set-top boxes (STBs). However, parental control systems typically only restrict access to a complete program. Such restriction may not be necessary when parts of the program are acceptable.

The zooming system may be used to look away from objectionable material by specifying the zoom target area such that the zoom target area includes a non-objectionable part of the image. The zoom control is typically automatically activated when the suitability age of the program does not fall within the criteria specified by the parental control rules.

Additionally or alternatively, the system of the present invention, in preferred embodiments thereof, also includes a system to enable a content consumer system to visually obscure, typically by pixelization, selected parts of video frames based on obscuring location indicators included in the digital video stream. The obscuring location indicators typically include a center of the obscuring target area as well as a magnitude of the obscuring target area. The magnitude is typically expressed as a radius extending from the center of the obscuring target area.

It will be appreciated by those ordinarily skilled in the art that the visual obscuring system can be implemented separately from, or together with, the zoom system.

There is thus provided in accordance with a preferred embodiment of the present invention a system for preparing a digital video stream for zooming by a content consumer system, including a video frame processor to prepare a plurality of video frames of the digital video stream, a zoom location processor to prepare a plurality of zoom location indicators in the digital video stream, each of the zoom location indicators including an element indicative of at least one horizontal position and at least one vertical position in the video frames, and a stream processor to temporally synchronize the zoom location indicators and the video frames in the digital video stream, such that the video frames are available to be zoomed by the content consumer system based on the zoom location indicators during playback of the digital video stream.

Further in accordance with a preferred embodiment of the present invention the video frames include data, the zoom location indicators and the data of the video frames being located in separate packets in the digital video stream.

Still further in accordance with a preferred embodiment of the present invention the element of each of the zoom location indicators is indicative of a center of a zoom target area.

Additionally in accordance with a preferred embodiment of the present invention each of the video frames includes a plurality of pixels, the horizontal position and the vertical position of the center being measured using the pixels.

Moreover in accordance with a preferred embodiment of the present invention each of the zoom location indicators includes a length indicative of a magnitude of the zoom target area.

Further in accordance with a preferred embodiment of the present invention each of the video frames includes a plurality of pixels, the length being measured using the pixels.

Still further in accordance with a preferred embodiment of the present invention the video frames include a first video frame associated with a first one of the zoom location indicators, and a second video frame associated with a second one of the zoom location indicators, and at least one intervening video frame temporally located between the first video frame and the second video frame, the zoom location indicators including an interpolation flag to inform the content consumer system whether to interpolate between the first zoom location indicator and the second zoom location indicator in order to determine an interpolated zoom location indicator for the at least one intervening video frame.

There is also provided in accordance with still another preferred embodiment of the present invention a system for preparing a digital video stream for zooming by a plurality of content consumer systems, including a video frame processor to prepare a plurality of video frames of the digital video stream, a zoom location processor to prepare a plurality of zoom location indicators in the digital video stream, each of the zoom location indicators including an element indicative of at least one horizontal position and at least one vertical position in the video frames, a stream processor to associate the zoom location indicators and the video frames in the digital video stream, such that the video frames are available to be zoomed by the content consumer systems based on the zoom location indicators during playback of the digital video stream, and a broadcasting module to prepare the digital video stream for broadcasting to the content consumer systems.

Additionally in accordance with a preferred embodiment of the present invention the video frames include data, the zoom location indicators and the data of the video frames being located in separate packets in the digital video stream.

Moreover in accordance with a preferred embodiment of the present invention the stream processor is operative to temporally synchronize the zoom location indicators and the video frames.

Further in accordance with a preferred embodiment of the present invention the video frames include data within a plurality of packets, the zoom location indicators being located within at least some of the packets of the data of the video frames.

Still further in accordance with a preferred embodiment of the present invention the element of each of the zoom location indicators is indicative of a center of a zoom target area.

Additionally in accordance with a preferred embodiment of the present invention each of the video frames includes a plurality of pixels, the horizontal position and the vertical position of the center being measured using the pixels.

Moreover in accordance with a preferred embodiment of the present invention each of the zoom location indicators includes a length indicative of a magnitude of the zoom target area.

Further in accordance with a preferred embodiment of the present invention each of the video frames includes a plurality of pixels, the length being measured using the pixels.

Still further in accordance with a preferred embodiment of the present invention the video frames include a first video frame associated with a first one of the zoom location indicators, and a second video frame associated with a second one of the zoom location indicators, and at least one intervening video frame temporally located between the first video frame and the second video frame, the zoom location indicators including an interpolation flag to inform the content consumer systems whether to interpolate between the first zoom location indicator and the second zoom location indicator in order to determine an interpolated zoom location indicator for the at least one intervening video frame.

There is also provided in accordance with still another preferred embodiment of the present invention a system for preparing a digital video stream for zooming by a content consumer system, including a video frame processor to prepare a plurality of video frames of the digital video stream, a zoom location processor to prepare a plurality of zoom location indicators in the digital video stream, each of the zoom location indicators including an element indicative of at least one horizontal position and at least one vertical position in the video frames, a stream processor to associate the zoom location indicators and the video frames in the digital video stream, such that the video frames are available to be zoomed by the content consumer system based on the zoom location indicators during playback of the digital video stream, and a recording module to prepare the digital video stream for recording onto a non-volatile digital storage medium for reading by the content consumer system.

Additionally in accordance with a preferred embodiment of the present invention the video frames include data, the zoom location indicators and the data of the video frames being located in separate packets in the digital video stream.

Moreover in accordance with a preferred embodiment of the present invention the stream processor is operative to temporally synchronize the zoom location indicators and the video frames.

Further in accordance with a preferred embodiment of the present invention the video frames include data within a plurality of packets, the zoom location indicators being located within at least some of the packets of the data of the video frames.

Still further in accordance with a preferred embodiment of the present invention the element of each of the zoom location indicators is indicative of a center of a zoom target area.

Additionally in accordance with a preferred embodiment of the present invention each of the video frames include a plurality of pixels, the horizontal position and the vertical position of the center being measured using the pixels.

Moreover in accordance with a preferred embodiment of the present invention each of the zoom location indicators includes a length indicative of a magnitude of the zoom target area.

Further in accordance with a preferred embodiment of the present invention each of the video frames include a plurality of pixels, the length being measured using the pixels.

Still further in accordance with a preferred embodiment of the present invention the video frames include a first video frame associated with a first one of the zoom location indicators, and a second video frame associated with a second one of the zoom location indicators, and at least one intervening video frame temporally located between the first video frame and the second video frame, the zoom location indicators including an interpolation flag to inform the content consumer system whether to interpolate between the first zoom location indicator and the second zoom location indicator in order to determine an interpolated zoom location indicator for the at least one intervening video frame.

There is also provided in accordance with still another preferred embodiment of the present invention a content consumer system for receiving a digital video stream, the digital video stream including a plurality of video frames and at least one location indicator, the location indicator including an element being indicative of at least one horizontal position and at least one vertical position in the video frames, the system including a stream receiver to receive the video frames and the at least one location indicator of the video stream from a broadcaster, and a display processor to process the video frames of the digital video stream based on the at least one location indicator during play of the digital video stream.

Additionally in accordance with a preferred embodiment of the present invention the processing of the video frames based on the at least one location indicator is selectable by a user of the content consumer system.

Moreover in accordance with a preferred embodiment of the present invention the display processor is operative to zoom the video frames based on the at least one location indicator during play of the video stream.

Further in accordance with a preferred embodiment of the present invention the magnitude of the zoom is determined by a user of the content consumer system.

Still further in accordance with a preferred embodiment of the present invention the display processor is operative to visually obscure at least part of the video frames based on the at least one location indicator during play of the video stream.

Additionally in accordance with a preferred embodiment of the present invention the display processor is operative to visually obscure at least part of the video frames in accordance with a parental control rule.

Moreover in accordance with a preferred embodiment of the present invention the display processor is operative to visually obscure at least part of the video frames using pixelization.

Further in accordance with a preferred embodiment of the present invention the video frames include a first video frame associated with a first location indicator, and a second video frame associated with a second location indicator, and at least one intervening video frame temporally located between the first video frame and the second video frame, the display processor being operative to interpolate between the first location indicator and the second location indicator in order to determine an interpolated location indicator for the at least one intervening frame.

Still further in accordance with a preferred embodiment of the present invention the video frames include data, the at least one location indicator and the data of the video frames being located in separate packets in the digital video stream.

Additionally in accordance with a preferred embodiment of the present invention the display processor is operative to temporally synchronize the at least one location indicator and the video frames.

Moreover in accordance with a preferred embodiment of the present invention the video frames include data within a plurality of packets, the at least one location indicator being located within at least one of the packets of the data of the video frames.

Further in accordance with a preferred embodiment of the present invention the element of the at least one location indicator is indicative of a center of a target area.

Still further in accordance with a preferred embodiment of the present invention each of the video frames includes a plurality of pixels, the horizontal position and the vertical position of the center being measured using the pixels.

Additionally in accordance with a preferred embodiment of the present invention the at least one location indicator includes a length indicative of a magnitude of the target area.

Moreover in accordance with a preferred embodiment of the present invention each of the video frames includes a plurality of pixels, the length being measured using the pixels.

There is also provided in accordance with still another preferred embodiment of the present invention a system for preparing a digital video stream to be at least partially visually obscured by a content consumer system, including a video frame processor to prepare a plurality of video frames of the digital video stream, an obscuring location processor to prepare at least one obscuring location indicator in the digital video stream, the at least one obscuring location indicator including an element indicative of at least one horizontal position and at least one vertical position in the video frames, and a stream processor to associate the at least one obscuring location indicator and the video frames in the digital video stream, such that at least part of the video frames are available to be visually obscured by the content consumer system based on the at least one obscuring location indicator during playback of the digital video stream.

Further in accordance with a preferred embodiment of the present invention the stream processor is operative to temporally synchronize the at least one obscuring location indicator and the video frames.

Still further in accordance with a preferred embodiment of the present invention, the system includes a broadcasting module to prepare the digital video stream for broadcasting to the content consumer system.

Additionally in accordance with a preferred embodiment of the present invention, the system includes a recording module to prepare the digital video stream for recording onto a non-volatile digital storage medium for reading by the content consumer system.

Moreover in accordance with a preferred embodiment of the present invention the video frames include data, the at least one obscuring location indicator and the data of the video frames being located in separate packets in the digital video stream.

Further in accordance with a preferred embodiment of the present invention the video frames include data within a plurality of packets, the at least one obscuring location indicator being located within at least one of the packets of the data of the video frames.

Still further in accordance with a preferred embodiment of the present invention the element of the obscuring location indicator is indicative of a center of an obscuring target area.

Additionally in accordance with a preferred embodiment of the present invention each of the video frames includes a plurality of pixels, the horizontal position and the vertical position of the center being measured using the pixels.

Moreover in accordance with a preferred embodiment of the present invention the at least one obscuring location indicator includes a length indicative of a magnitude of the obscuring target area.

Further in accordance with a preferred embodiment of the present invention each of the video frames includes a plurality of pixels, the length being measured using the pixels.

Still further in accordance with a preferred embodiment of the present invention the video frames include a first video frame associated with a first obscuring location indicator, and a second video frame associated with a second obscuring location indicator, and at least one intervening video frame temporally located between the first video frame and the second video frame, the at least one obscuring location indicator including an interpolation flag to inform the content consumer system whether to interpolate between the first obscuring location indicator and the second obscuring location indicator in order to determine an interpolated obscuring location indicator for the at least one intervening video frame.

Additionally in accordance with a preferred embodiment of the present invention the at least one obscuring location indicator includes at least one pixelization location indicator, such that at least part of the video frames are available to be visually obscured by pixelization by the content consumer system based on the at least one pixelization location indicator during playback of the digital video stream.

There is also provided in accordance with still another preferred embodiment of the present invention a non-volatile digital storage medium readable by a content consumer system, the non-volatile digital storage medium including a digital video stream including a plurality of video frames, and at least one location indicator, the at least one location indicator including an element indicative of at least one horizontal position and at least one vertical position in the video frames, the video frames and the at least one location indicator being associated such that the video frames are available to be processed by the content consumer system based on the at least one location indicator during playback of the digital video stream.

Moreover in accordance with a preferred embodiment of the present invention the digital video stream also includes at least one synchronization element for synchronizing the at least one location indicator and the video frames in the digital video stream.

Further in accordance with a preferred embodiment of the present invention the at least one synchronization element is a temporal synchronization element.

Still further in accordance with a preferred embodiment of the present invention the at least one location indicator is a zoom location indicator, such that the video frames are available to be zoomed by the content consumer system based on the at least one location indicator during playback of the digital video stream.

Additionally in accordance with a preferred embodiment of the present invention the at least one location indicator includes at least one obscuring location indicator, such that at least part of the video frames are available to be visually obscured by the content consumer system based on the at least one location indicator during playback of the digital video stream.

Moreover in accordance with a preferred embodiment of the present invention the at least one obscuring location indicator includes at least one pixelization location indicator, such that at least part of the video frames are available to be visually obscured by pixelization by the content consumer system based on the at least one pixelization location indicator during playback of the digital video stream.

Further in accordance with a preferred embodiment of the present invention the video frames include data, the at least one location indicator and the data of the video frames being located in separate packets in the digital video stream.

Still further in accordance with a preferred embodiment of the present invention the video frames include data within a plurality of packets, the at least one location indicator being located within at least one of the packets of the data of the video frames.

Additionally in accordance with a preferred embodiment of the present invention the element of the at least one location indicator is indicative of a center of a zoom target area.

Moreover in accordance with a preferred embodiment of the present invention each of the video frames includes a plurality of pixels, the horizontal position and the vertical position of the center being measured using the pixels.

Further in accordance with a preferred embodiment of the present invention the at least one location indicator includes a length indicative of a magnitude of the target area.

Still further in accordance with a preferred embodiment of the present invention each of the video frames includes a plurality of pixels, the length being measured using the pixels.

Additionally in accordance with a preferred embodiment of the present invention the video frames include a first video frame associated with a first location indicator, and a second video frame associated with a second location indicator, and at least one intervening video frame temporally located between the first video frame and the second video frame, the at least one location indicator including an interpolation flag to inform the content consumer system whether to interpolate between the first location indicator and the second location indicator in order to determine an interpolated location indicator for the at least one intervening video frame.

There is also provided in accordance with still another preferred embodiment of the present invention a method for preparing a digital video stream for zooming by a content consumer system, including preparing a plurality of video frames of the digital video stream, preparing a plurality of zoom location indicators in the digital video stream, each of the zoom location indicators including an element indicative of at least one horizontal position and at least one vertical position in the video frames, and temporally synchronizing the zoom location indicators and the video frames in the digital video stream, such that the video frames are available to be zoomed by the content consumer system based on the zoom location indicators during playback of the digital video stream.

There is also provided in accordance with still another preferred embodiment of the present invention a method for preparing a digital video stream for zooming by a plurality of content consumer systems, including preparing a plurality of video frames of the digital video stream, preparing a plurality of zoom location indicators in the digital video stream, each of the zoom location indicators including an element indicative of at least one horizontal position and at least one vertical position in the video frames, associating the zoom location indicators and the video frames in the digital video stream, such that the video frames are available to be zoomed by the content consumer systems based on the zoom location indicators during playback of the digital video stream, and preparing the digital video stream for broadcasting to the content consumer systems.

There is also provided in accordance with still another preferred embodiment of the present invention a method for preparing a digital video stream for zooming by a content consumer system, including preparing a plurality of video frames of the digital video stream, preparing a plurality of zoom location indicators in the digital video stream, each of the zoom location indicators including an element indicative of at least one horizontal position and at least one vertical position in the video frames, associating the zoom location indicators and the video frames in the digital video stream, such that the video frames are available to be zoomed by the content consumer system based on the zoom location indicators during playback of the digital video stream, and preparing the digital video stream for recording onto a non-volatile digital storage medium for reading by the content consumer system.

There is also provided in accordance with still another preferred embodiment of the present invention a method for receiving a digital video stream, the digital video stream including a plurality of video frames and at least one location indicator, the location indicator including an element being indicative of at least one horizontal position and at least one vertical position in the video frames, the method including receiving the video frames and the at least one location indicator of the video stream from a broadcaster, and process the video frames of the digital video stream based on the at least one location indicator during play of the digital video stream.

There is also provided in accordance with still another preferred embodiment of the present invention a method for preparing a digital video stream to be at least partially visually obscured by a content consumer system, including preparing a plurality of video frames of the digital video stream, preparing at least one obscuring location indicator in the digital video stream, the at least one obscuring location indicator including an element indicative of at least one horizontal position and at least one vertical position in the video frames, and associating the at least one obscuring location indicator and the video frames in the digital video stream, such that at least part of the video frames are available to be visually obscured by the content consumer system based on the obscuring location indicators during playback of the digital video stream.

BRIEF DESCRIPTION OF THE DRAWINGS

The present invention will be understood and appreciated more fully from the following detailed description, taken in conjunction with the drawings in which:

FIG. 3 is a pictorial view showing the interpolation of location indicators in a set-top box of the system of FIG. 1;

FIG. 4 is a simplified view of a digital video stream for use with the system of FIG. 1;

FIG. 5 is a simplified view of another digital video stream for use with the system of FIG. 1;

DETAILED DESCRIPTION OF A PREFERRED EMBODIMENT

Persons skilled in the art will appreciate that, throughout the present application, a set-top box is used by way of example only, and that the present invention is not limited to a particular type of content consumer system, but rather includes any suitable content consumer system, for example, but not limited to, a handheld TV device or DVD player.

Figure 1:
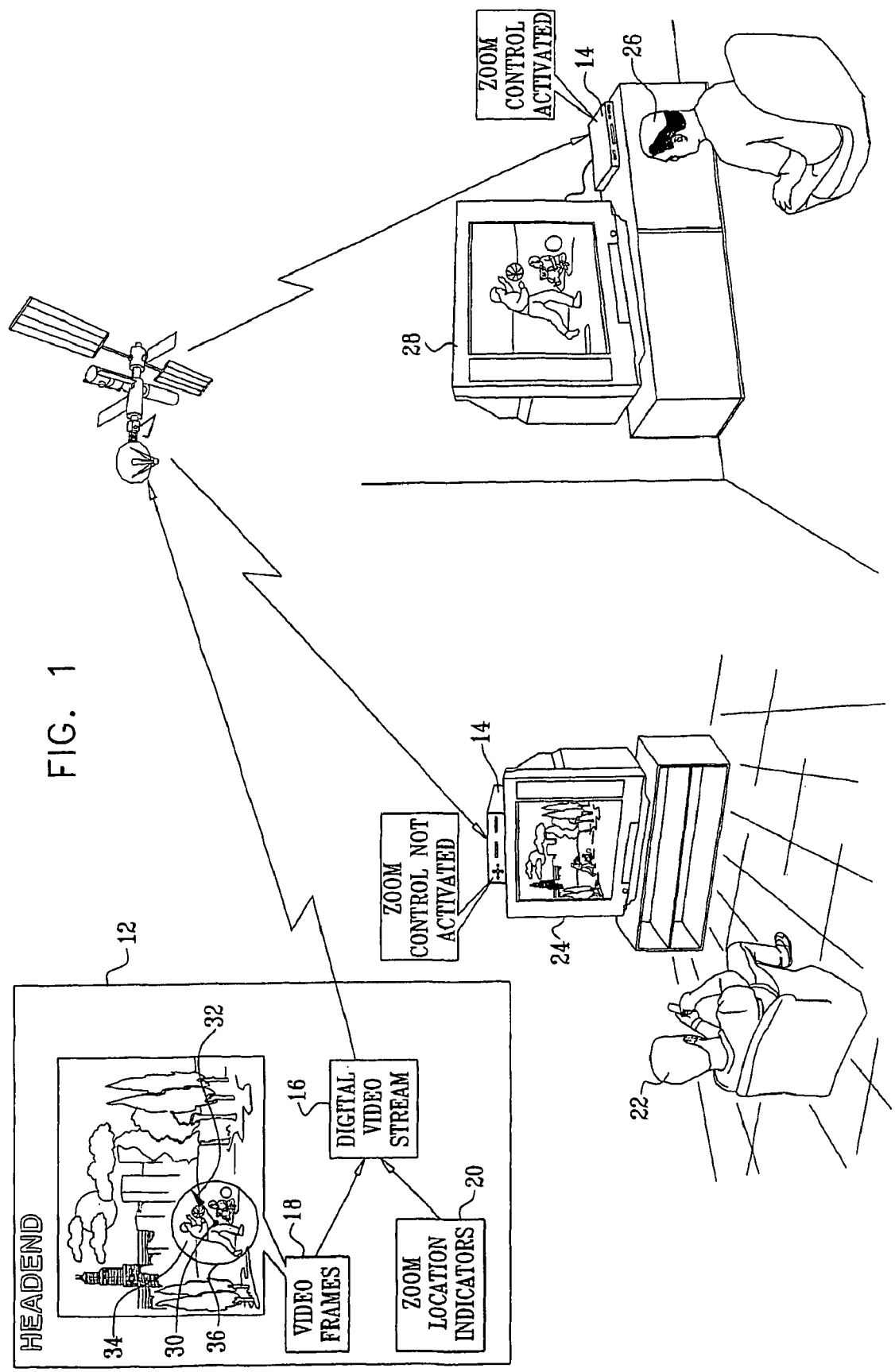
FIG. 1 is a partly pictorial, partly block diagram view of a system for zooming video frames constructed and operative in accordance with a preferred embodiment of the present invention.

Reference is now made to FIG. 1, which is a partly pictorial, partly block diagram view of a system 10 for zooming video frames constructed and operative in accordance with a preferred embodiment of the present invention. The system 10 preferably includes a Headend 12 for broadcasting a digital video stream 16 to a plurality of set-top boxes 14. The Headend 12 preferably prepares the digital video stream 16 which typically includes a plurality of video frames 18 and a plurality of zoom location indicators 20.

The zoom location indicators 20 preferably include a center 30 of a zoom target area 34 and a magnitude of the zoom target area 34, the magnitude typically being a length, for example, a radius 32 extending from the center 30 to a circumference 36 of the zoom target area 34.

The center 30 of the zoom target area 34 is generally an element indicative of a horizontal position and a vertical position in the video frame 18. The center 30 is preferably measured using pixels. Similarly, the radius 32 of the zoom target area 34 is preferably measured using pixels.

The set-top boxes 14 preferably use the radius 32 to calculate what level of zoom is needed to fill the screen with the zoom target area 34 of the video image enclosed by the circumference 36.

The zoom location indicators 20 are described in more detail with reference to FIGS. 2 and 3.

The zoom location indicators 20 are typically defined during post-production or other processes associated with live TV production, described in more detail with reference to FIG. 6. Typically, change of shot and/or camera events are recognized and suitable methods are used to manually or automatically specify the center 30 and/or radius 32 of the zoom target area 34 of the selected video frames in order to generating time stamped metadata including the zoom location indicators 20. Zoom location indicators for frames between the selected video frames are preferably determined using any suitable interpolation technique processed either at the Headend 12 or in the set-top boxes 14.

The zoom location indicators 20 are typically included in the digital video stream 16 as a stream of low bandwidth, time-stamped metadata.

The digital video stream 16 is received by the set-top boxes 14.

A viewer 22 is viewing a TV 24 and a viewer 26 is viewing a TV 28. The viewer 22 of the TV 24 does not require the received video frames 18 to be enlarged. However, the viewer 26 of the TV 28 has impaired vision and wants to activate the zoom control function of the set-top box 14.

Therefore, the video frames 18 are displayed on the TV 24 without enlargement thereby ignoring the zoom location indicators 20, whereas the video frames 18 are displayed on the TV 28 with enlargement based on the zoom location indicators 20 resulting in a larger display of the area of the image around the center 30, and the loss of some of the image outside of the zoom target area 34.

Digital video transmission and synchronization systems in the set-top boxes 14 typically enable the time-stamped metadata of the zoom location indicators 20 to be processed, and where needed interpolated, without the need for substantial additional CPU demand. The processing systems of the set-top boxes 14 are described in more detail with reference to FIG. 7.

Figure 2:
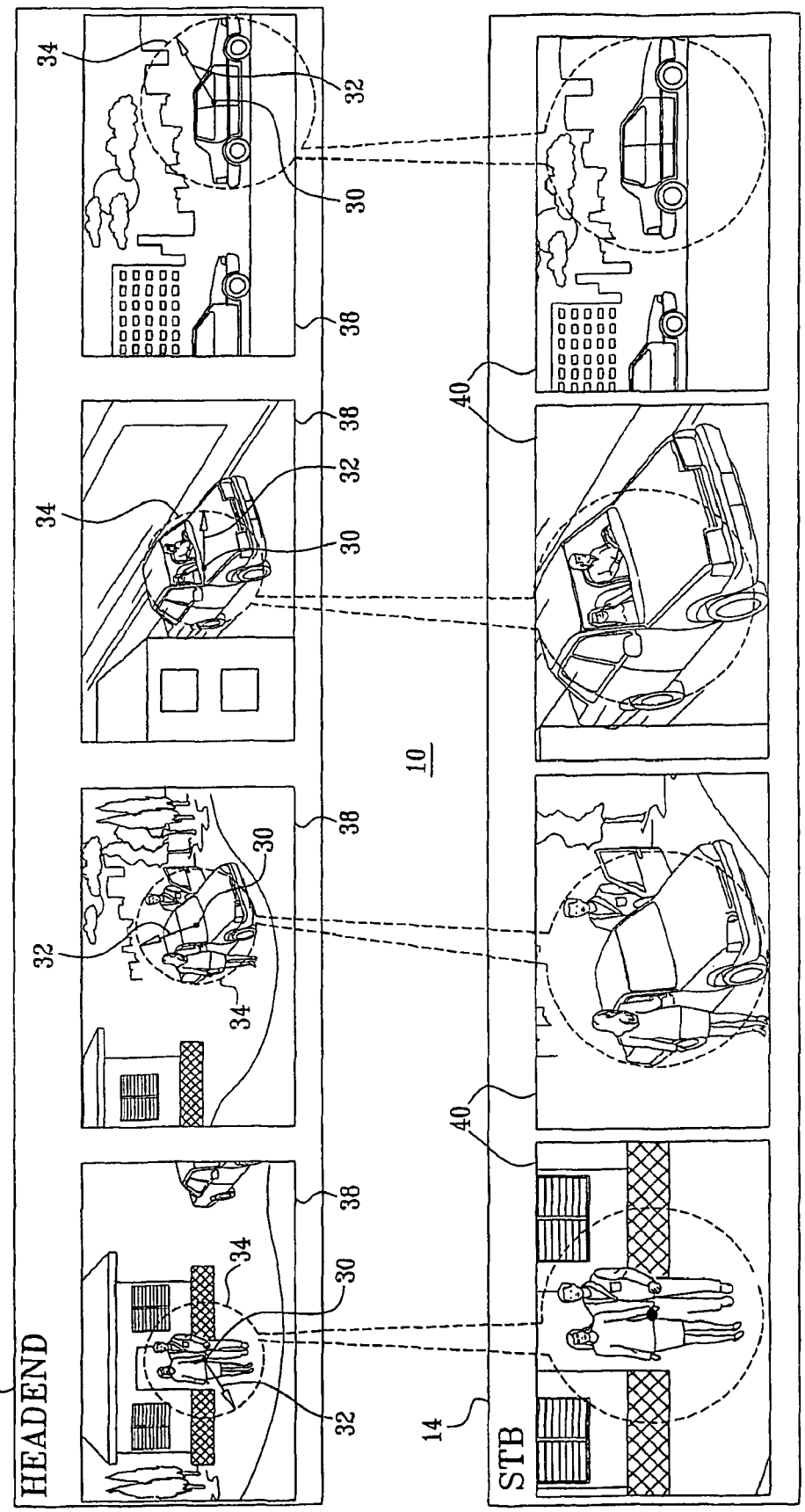
FIG. 2 is a pictorial view of a plurality of annotated video frames at a Headend and processed video frames at a set-top box of the system of FIG. 1.

Reference is now made to FIG. 2, which is a pictorial view of a plurality of annotated video frames 38 at the Headend 12 and a plurality of processed video frames 40 at the set-top box 14 of the system 10 of FIG. 1. Each annotated video frame 38 is shown with the center 30 and the radius 32 of the zoom target area 34 superimposed thereon for the sake of simplicity. However, it should be noted that center 30 and the radius 32 are not visually superimposed over the video frames 38. The center 30 and radius 32 are typically included as numerical data which is included within the digital video stream 16 (FIG. 1) preferably as metadata.

FIG. 2 shows that the zoom target area 34 varies in position and size between the video frames 38. The video frames 38 are processed in the set-top box 14 based on the center 30 and radius 32 of each video frame 38, resulting in processed video frames 40.

Reference is now made to FIG. 3, which is a pictorial view showing a preferred example of interpolation of the zoom location indicators 20 in the set-top box 14 of the system 10 of FIG. 1. The digital video stream 16 broadcast by the Headend 12 includes a video frames 42, 44, 46, 48. The video frame 42 has associated zoom location indicators 20 including a center 50 and a radius 52. The video frame 48 has associated zoom location indicators 20 including a center 54 and a radius 56. The intervening video frames 44, 46 which are temporally located between the video frames 42, 48, do not have explicit zoom location indicators 20.

Therefore, there are two processing options available for the set-top box 14. The first option is to use the center 50 and radius 52 of the video frame 42 to determine the zooming of the intervening video frames 44, 46. The second option is to interpolate between the centers 50, 54 and radii 52, 56, respectively, of the video frame 42 and the video frame 48 in order to determine the zooming of the intervening video frames 44, 46.

It will be appreciated that the first option will be more preferred for certain frames, while the second option will be more preferred for other frames. Therefore, the zoom location indicators 20 associated with the video frame 42 preferably include an interpolation flag 58 which informs the set-top box 14 whether to interpolate between the center 50 and the radius 52 of the video frame 42 and the center 54 and radius 56 of the video frame 48, respectively, in order to determine an interpolated center 60 and an interpolated radius 62 for the video frame 44 and an interpolated center 64 and an interpolated radius 66 for the video frame 46.

It should be noted that the data of the center 54 and the radius 56 needs to be broadcast (or played back) early enough (possibly before the video data of the video frame 48 is broadcast/played back) so that the interpolated center 60, the interpolated radius 62, the interpolated center 64 and the interpolated radius 66 can be calculated in time for processing display of the video frame 44 and the video frame 46.

TABLE 1

| Time | X pixels | Y pixels | R pixels | Interpolation Flag | Comment (not part of metadata) |
|---|---|---|---|---|---|
| 10000000 | 305 | 200 | 80 | N | Fixed zoom location indicators |
| 10000100 | 234 | 180 | 80 | Y | Start of move |
| 10000500 | 349 | 245 | 70 | N | End of move |
| 10000501 | 212 | 306 | 95 | N | Shot change |

An example of the metadata format including the zoom location indicators 20 is shown in table 1, wherein "Time" is typically specified in either production format (HH:MM:SS:FF) or presentation time stamp (PTS) format according to the overall system architecture, "X pixels" and "Y pixels" are the horizontal and vertical coordinates in pixels of the center 30, "R pixels" is the radius in pixels and "Interpolation Flag" advises the set-top boxes 14 whether or not to interpolate the data, as described above.

Reference is now made to FIG. 4, which is a simplified view of the digital video stream 16 for use with the system 10 of FIG. 1. The zoom location indicators 20 and the data of the video frames 18 are preferably located in separate packets 70 in the digital video stream 16. For example, the data of the video frame 18, with a time stamp, $t_1$, is located in a packet 72 and the zoom location indicators 20, with a time stamp, $t_1$, are located in a packet 74. The data of the video frame 18 of the packet 72 is associated with the zoom location indicators 20 of the packet 74 by the time stamp, $t_1$. Therefore, in even though all the data of the video frames 18 and the zoom location indicators 20 are in separate packets 70, video frames 18 are typically matched with associated zoom location indicators 20 by temporal synchronization using the time stamps of each packet 70.

It should be noted that the data of a single video frame 18 typically requires many of the packets 70 in order to carry all the data of the single video frame 18.

Temporal synchronization is now described in more detail with reference to Digital Video Broadcast (DVB) transport streams carrying MPEG-2 compressed video. It will be appreciated by those ordinarily skilled in the art that temporal synchronization can be applied to other suitable transport stream systems. The MPEG-2 compressed video stream typically includes video, audio and subtitling data. As the data passes through a video compressor (not shown) at the Headend 12, each packet 70 of each data type for each program is typically assigned a separate packet ID (PID) (not shown). For example, all the video data packets for a single program typically have the same common PID. All the English Audio packets (not shown) for the same program typically have another common PID. Each packet 70 also generally includes a Presentation Time Stamp (PTS) value (for example $t_1$ in FIG. 4) which is typically derived from the master clock (not shown) in the compressor.

The different streams are generally delivered to the video, audio and subtitling decoders (not shown) in the set-top box 14 with different delivery latencies and buffer models. The PTS of each packet 70 generally enables the three streams to be re-synchronized within the set-top box 14 so that the video, audio and subtitling are presented to the viewer with the same synchronization timing relationship the data had when the data was presented to the compressor at the Headend 12.

Similarly, the packets containing the metadata associated with the zoom location indicators 20 of a program are preferably assigned a common PID by the compressor at the Headend 12. Each packet 72 containing the zoom location indicators 20 is preferably assigned a PTS by the master clock. Therefore, the packets 72 containing the zoom location indicators 20 are typically temporally synchronized to the packets 74 containing the data of the video frames 18 in the set-top box 14 by using the PTS of the packets 70.

The above synchronization method is simple to implement and is fully compatible with most existing and legacy MPEG set-top boxes.

Reference is now made to FIG. 5, which is a simplified view of another digital video stream 76 for use with the system 10 of FIG. 1. In accordance with an alternative preferred embodiment of the present invention, the zoom location indicators 20 are located within the packets 70 of the data of the video frames 18 thereby automatically associating the zoom location indicators 20 and the video frames 18. Therefore, the zoom location indicators 20 typically do not need to be synchronized with the video frames 18. It should be noted that the video syntax of existing transport standards, for example, but not limited to, MPEG-2, may require revision. Additionally, legacy set-top boxes may not be compatible with the revised video syntax.

Figure 6:
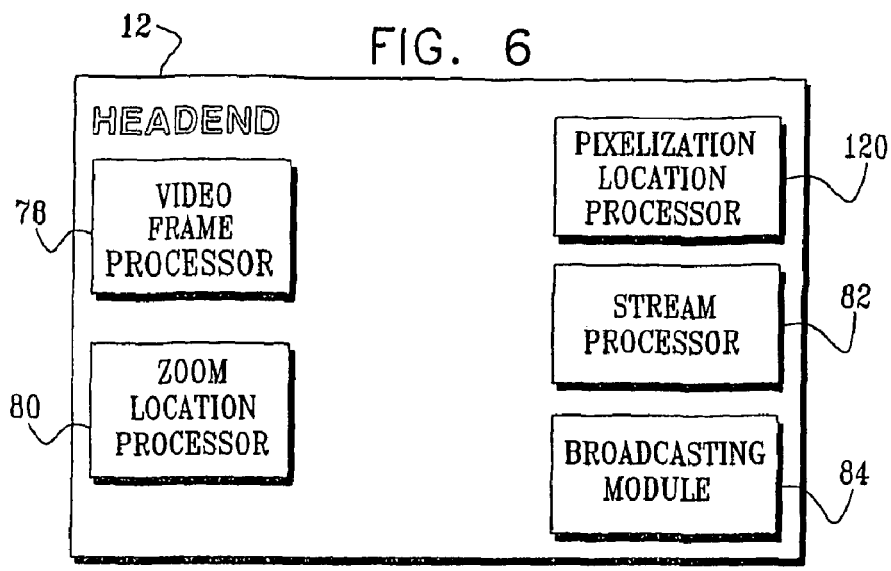
FIG. 6 is a block diagram view of a Headend of the system of FIG. 1.

Reference is now made to FIG. 6, which is a block diagram view of the Headend 12 of the system 10 of FIG. 1. Reference is also made to FIG. 1. The Headend 12 preferably includes a video frame processor 78, a zoom location processor 80, a stream processor 82 and a broadcasting module 84.

The video frame processor 78 preferably prepares the video frames 18 of the digital video stream 16 typically including encoding (and compressing), multiplexing and optionally (but preferably) scrambling.

The zoom location processor 80 preferably prepares the zoom location indicators 20 in the digital video stream 16 typically including encoding, multiplexing and optionally (but preferably) scrambling.

The stream processor 82 preferably associates the zoom location indicators 20 and the video frames 18 in the digital video stream 16, such that the video frames 18 are available to be zoomed by the set-top boxes 14 based on the zoom location indicators 20 during playback of the digital video stream 16.

When the zoom location indicators 20 and the data of the video frames 18 are located in separate packets 70 (FIG. 4) in the digital video stream 16, the stream processor 82 is typically operative to temporally synchronize the zoom location indicators 20 and the video frames 18 using a time stamp in each packet of the digital video stream 16. The time stamp is typically added during encoding of the video frames 18 and the zoom location indicators 20.

The broadcasting module 84 preferably prepares the digital video stream 16 for broadcasting to the set-top boxes 14 typically including: modulating the digital video stream 16 for transmission in a satellite, cable or terrestrial broadcast environment; or preparing packets for broadcast in an Internet Protocol (IP) broadcast environment; and sending the digital video stream 16 to a transmitter for onward transmission.

The values assigned to the zoom location indicators 20 are typically determined by the content provider who supplies the zoom location indicators 20 and the video frames 18 to the Headend 12 for preparation for broadcasting.

The zoom location indicators 20 are typically determined using one or more of the following methods.

The first method typically includes manually entering the zoom location indicators 20 by examination of the prerecorded video and using suitable tools to mark the target. Customization of commercially available conventional video editing workstations and user input devices, for example, available from Avid Technology, Inc., Avid Technology Park, One Park West, Tewksbury, Mass. 01876, United States, may be used to generate the zoom location indicators 20.

The second method typically includes automated detection of faces (a "talking head" shot) to identify an area of screen which corresponds to the head of an individual who is speaking.

The third method typically includes three dimensional positioning and/or telemetry on a moving vehicle and similar objects in sports coverage to identify key objects in a wider shot. Currently, the third method is used to add graphics to moving cars in National Association for Stock Car Auto Racing (NASCAR) coverage.

The fourth method typically includes using a simple fixed "safe area" overlay on a camera viewer which helps the cameraman frame a shot so the zoom target area 34 target is within the centre 30 of the shot. It should be noted that whilst it is true that the centre 30 will be a constant value for the image generated by the camera, the radius 32 may change from camera to camera. The radius may be a function of the camera zoom and/or focus. Also, in a given program, the shot typically changes continuously and whilst some shots will be based on the fourth method, other shots may be based on one of the other methods having more dynamic zoom location indicator 20 data.

The fifth method typically includes automatically analyzing the graphic image to find a pre-determined object (such as the position of the ball or a particular player or players in a game) for example, but not limited to, by recognizing a color or a shape. Similar methods are in use in graphic processing, where for example, an actor in a color-keyed suit is marked with small lights or colored markers, so that his movements can be recorded.

The sixth method typically includes using semi-automated methods, such as eye-tracking of an operator or group of operators. For example, a commentator wears a headset with a faceplate or lenses (or utilizing other methods to record eye-movements). The movements are generally converted into zoom location indicators 20 in real time, so that the viewer can be focused on the same view as the commentator (s). It should be noted that the use of eye-tracking is already in use for military targeting.

Figure 7:
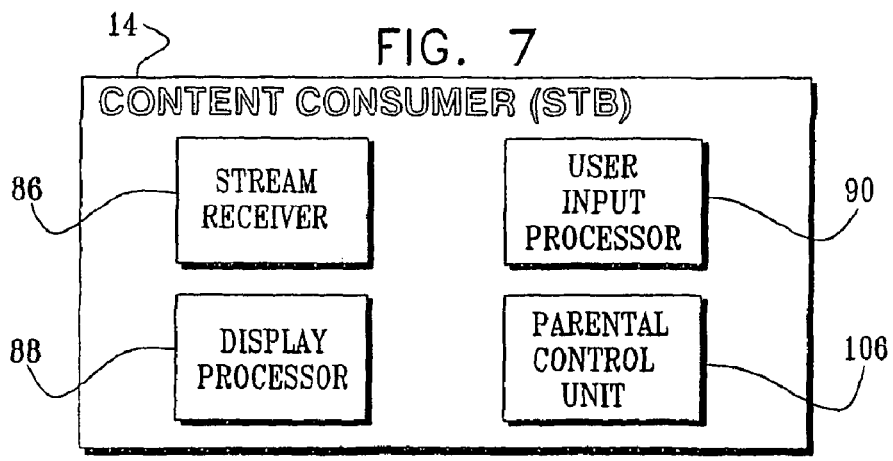
FIG. 7 is a block diagram view of a set-top box for use with the system of FIG. 1.

Reference is now made to FIG. 7, which is a block diagram view of the set-top box (STB) 14 for use with the system 10 of FIG. 1. Reference is also made to FIG. 1. The set-top box 14 preferably includes a stream receiver 86, a display processor 88 and a user input processor 90. The stream receiver 86 typically receives the video frames 18 and the zoom location indicators 20 of the digital video stream 16 from the broadcaster.

The display processor 88 generally processes the video frames 18 of the digital video stream 16 based on the zoom location indicators 20 during play of the digital video stream 16 such that the video frames 18 are preferably zoomed based on the zoom location indicators 20. When the location indicators 20 and the data of the video frames 18 are in separate packets 70 (FIG. 4), the display processor 88 is typically operative to temporally synchronize the zoom location indicators 20 and the video frames 18.

By way of example only, a standard feature of all MPEG-2 (and MPEG-4) video decoders, found in interactive set-top boxes, is to selectively render resize and pan the full screen video so as to present a smaller "window" of the full screen video at a larger size. For example, a common feature in interactive sports and news applications is to select one quadrant of a "four image" composite video feed and then zoom the selected quadrant to double size in both the horizontal and vertical directions so as to completely fill the full screen output image. The zooming performed by display processor 88 is typically implemented using the native capability of an MPEG-2 (or MPEG-4) decoder to support the zooming functionality of the display processor 88. Some small extensions to the video driver and/or code rendering may be needed to support the functionality of the display processor 88 in the most efficient way.

The display processor 88 is also typically operative to interpolate between zoom location indicators 20 of two video frames 42, 48 for one or more intervening video frames 44, 46 (FIG. 3) in order to determine the interpolated centers 60, 64 and the interpolated radii 62, 66 for the intervening video frames 44, 46.

The user input processor 90 is generally operative to allow the user to select the operational mode of the set-top box 14 either to operate in non-zoom mode or in zoom mode. Therefore, the processing of the video frames 18 based on the set-top box 14 is typically selectable by a user of the set-top box 14.

The user input processor 90 is generally operative such that the magnitude of the zoom is optionally determined by a user of the content consumer system in order to specify a fixed zoom or a zoom which is a multiple of the radius 32 (proportionately increased zoom).

Figure 8:
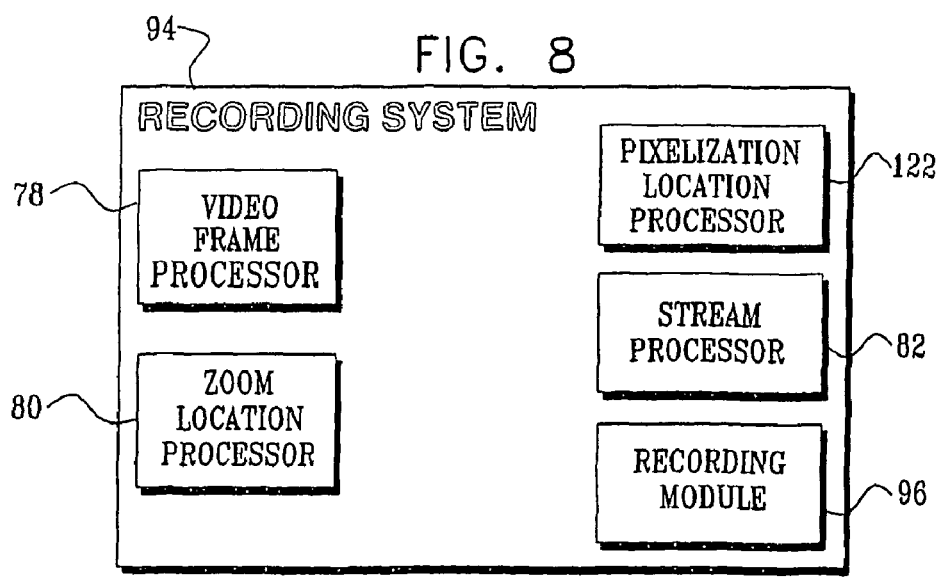
FIG. 8 is a block diagram view of a recording system constructed and operative in accordance with a preferred embodiment of the present invention.

Reference is now made to FIG. 8, which is a block diagram view of a recording system 94 constructed and operative in accordance with a preferred embodiment of the present invention. The recording system is substantially the same as the Headend 12 described with reference to FIG. 6, except for the following differences.

The recording system 94 does not typically need the broadcasting module 84 (FIG. 6), which is preferably replaced by a recording module 96. The recording module 96 is typically operative to prepare the digital video stream 16 (FIG. 4) for recording onto a non-volatile digital storage medium 98 (FIG. 9) for reading by a content consumer system, for example, but not limited to, a DVD player or any other suitable media player. The preparations functions of the recording module 96 preferably include formatting the digital video stream 16 for the non-volatile digital storage medium 98, sending the formatted digital video stream 16 to a writing device (not shown) and sending instructions to the writing device.

The video frame processor 78, the zoom location processor 80 and the stream processor 82 are substantially the same as described with reference to FIG. 6.

The non-volatile digital storage medium 98 (FIG. 9) is shown by way of example as a DVD. However, it will be appreciated by those ordinarily skilled in the art that non-volatile digital storage medium 98 may be any suitable non-volatile storage medium for example, but not limited to, Flash or magnetic disk.

Figure 9:
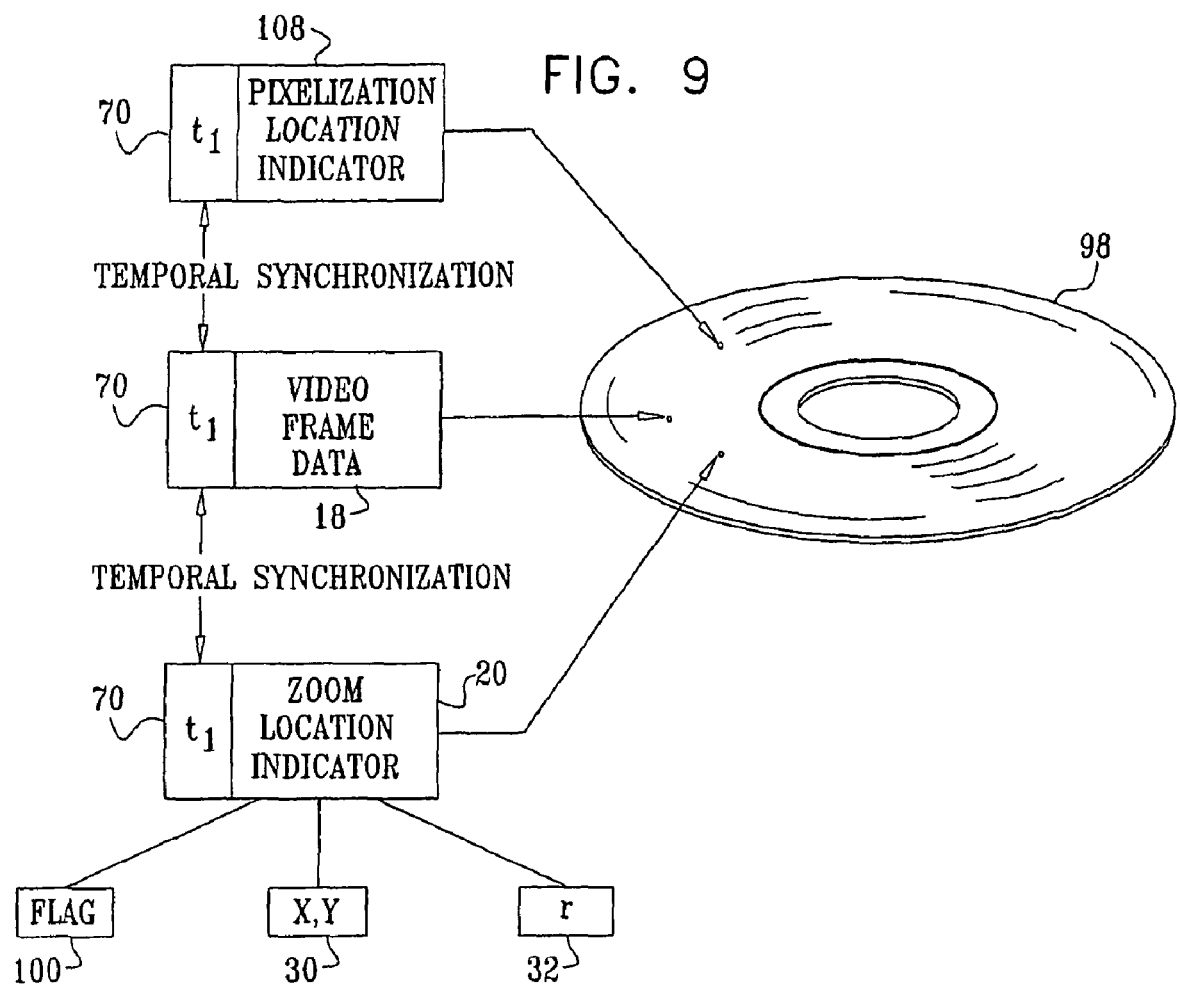
FIG. 9 is a partly pictorial, partly block diagram view of a non-volatile digital storage medium formed by the recording system of FIG. 8.

Reference is now made to FIG. 9, which is a partly pictorial, partly block diagram view of the non-volatile digital storage medium 98 formed by the recording system of FIG. 8. The non-volatile digital storage medium 98 typically includes the video frames 18 (only one shown for clarity) and the zoom location indicators 20 including the center 30, radius 32 and an interpolation flag 100.

The zoom location indicators 20 and the data of the video frames 18 are typically located in separate packets 70 in the digital video stream 16. The digital video stream 16 also preferably includes temporal synchronization elements ($t_1$, by way of example in FIG. 9) for synchronizing the zoom location indicators 20 and the video frames 18 in the digital video stream 16.

The interpolation flag 100 generally informs the content consumer system whether to interpolate between the zoom location indicators 20 as described with reference to FIG. 3.

Figure 10:
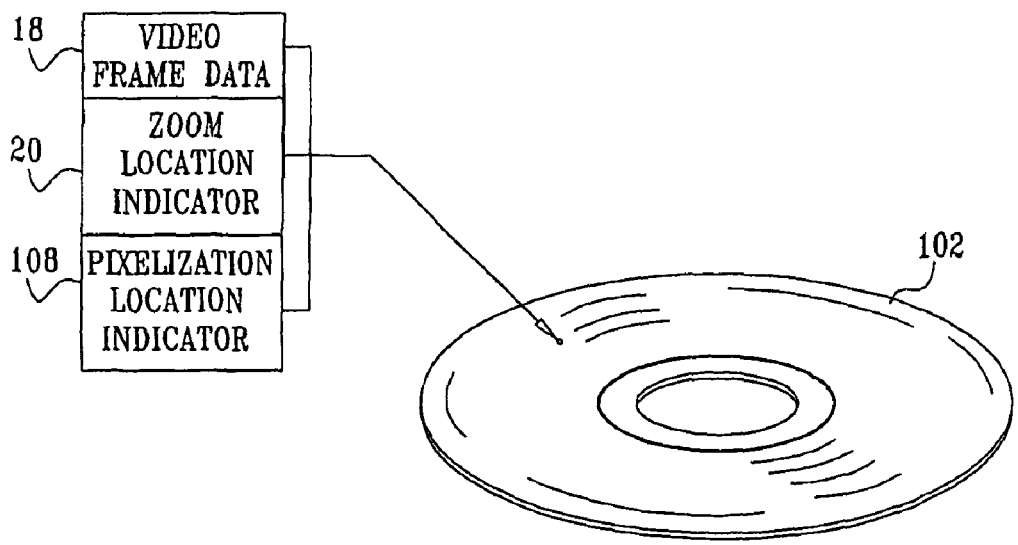
FIG. 10 is partly pictorial, partly block diagram view of another non-volatile digital storage medium formed by the recording system of FIG. 8.

Reference is now made to FIG. 10, which is partly pictorial, partly block diagram view of another non-volatile digital storage medium 102 formed by the recording system of FIG. 8. The zoom location indicators 20 are preferably included in the packets of the data of the video frames 18 as described with reference to FIG. 5.

Reference is again made to FIG. 7. By way of introduction, it is known that media content can be restricted for certain viewers, for example, preventing children from viewing certain programs using parental control systems available in media devices such as set-top boxes (STBs). However, parental control systems typically only restrict access to a complete program. Such restriction may not be necessary when parts of the program are acceptable.

The system 10 described with reference to FIGS. 1 to 10 may be used to look away from objectionable material by specifying the center 30 and the radius 32 such that the zoom target area 34 includes a non-objectionable part of the image. The zoom control is typically automatically activated when the suitability age of the program does not fall within the criteria specified by the supervisors of the set-top box 14 as defined in the parental control rules managed by a parental control 106 unit of the set-top box 14.

Another system, constructed and operative in accordance with a preferred embodiment of the present invention, for dealing with objectionable material, is described below.

Figure 11:
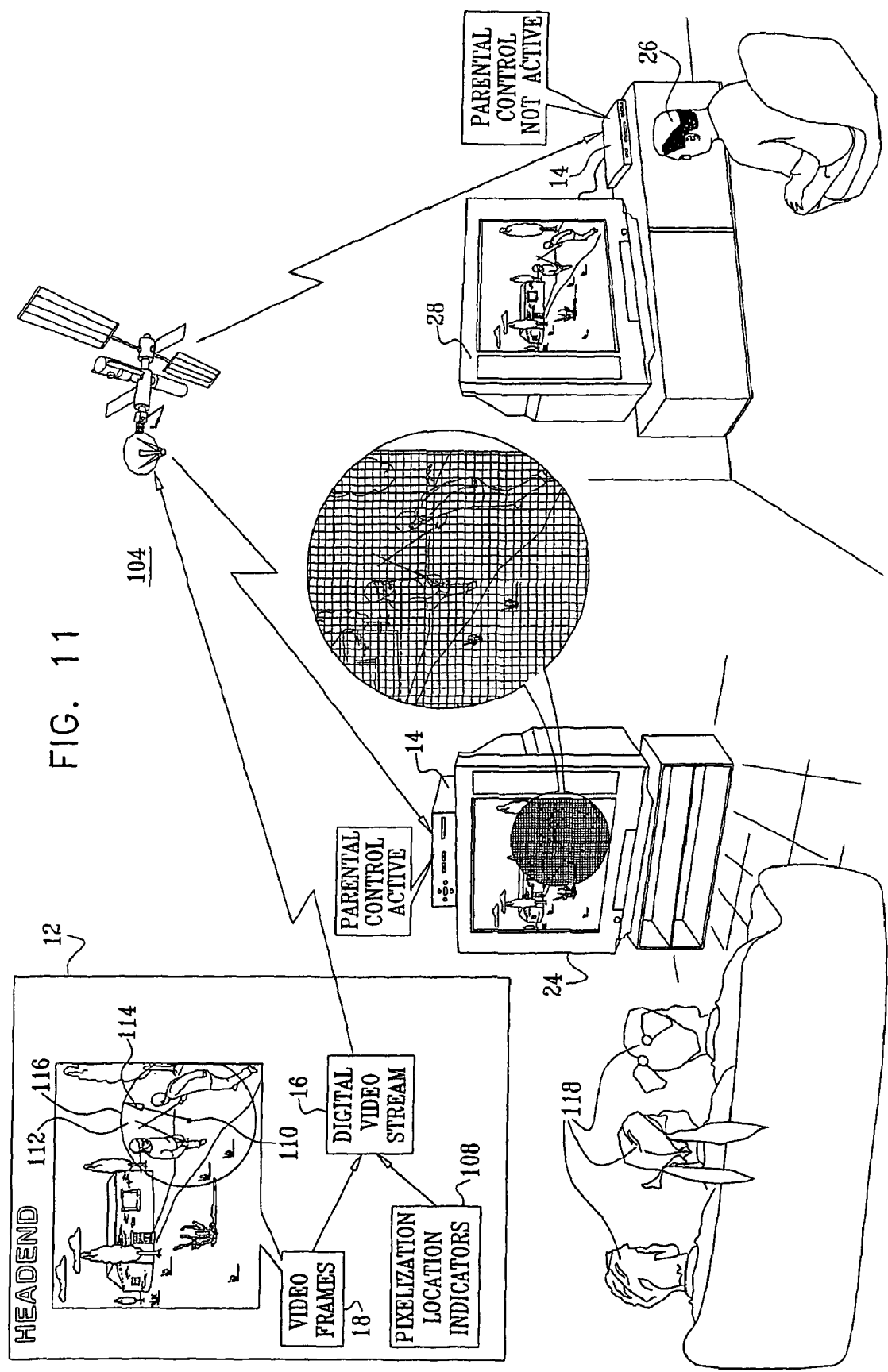
FIG. 11 is a party pictorial, partly block diagram view of a system for visually obscuring at least part of selected video frames constructed and operative in accordance with a preferred embodiment of the present invention.

Reference is now made to FIG. 11, which is a party pictorial, partly block diagram view of a system 104 for visually obscuring, typically using pixelization, at least part of selected video frames 18 constructed and operative in accordance with a preferred embodiment of the present invention. The system 104 preferably includes the Headend 12 for broadcasting the digital video stream 16 to the set-top boxes 14. The Headend 12 typically prepares the digital video stream 16 which includes the video frames 18 and a plurality of obscuring location indicators, typically pixelization location indicators 108.

The pixelization location indicators 108 are substantially the same as the zoom location indicators 20, as described below. The pixelization location indicators 108 preferably include a center 110 of an obscuring (pixelization) target area 112 and a magnitude of the obscuring target area 112, the magnitude typically being a length, for example, a radius 114 extending from the center 110 to a circumference 116 of the obscuring target area 112.

The center 110 of the obscuring target area 112 is an element typically indicative of a horizontal position and a vertical position in the video frame 18. The center 110 is preferably measured using pixels. Similarly, the radius 114 of the zoom target area 112 is preferably measured using pixels.

The set-top boxes 14 preferably use the radius 114 to calculate the size of the obscuring target area 112. The area enclosed by the circumference 116 of the obscuring target area 112 is preferably obscured, typically using pixelization. However, it will be appreciated by those ordinarily skilled in the art that other obscuring methods may be used, for example, but not limited to, using an opaque colored mask.

The pixelization location indicators 108 are typically defined during post-production or other processes associated with live TV production. Typically, the pixelization location indicators 108 are defined manually in order to specify the center 110 and radius 114 of the obscuring target area 112 of the selected video frames in order to generating time stamped metadata including the pixelization location indicators 108. Pixelization location indicators 108 for frames between the selected video frames are preferably determined using any suitable interpolation technique processed either at the Headend 12 or in the set-top boxes 14.

The pixelization location indicators 108 are typically included in the digital video stream 16 as a stream of low bandwidth, time-stamped metadata.

The digital video stream 16 is received by the set-top boxes 14.

A plurality of viewers 118 are viewing the TV 24 and the viewer 26 is viewing a TV 28. The viewers 118 of the TV 24 are subject to parental control rules and the obscuring system 104 is activated so that selected parts of selected video frames 18 are displayed with pixelization, as shown. The decoder of the set-top box 14 associated with the TV 24 renders the obscuring target area 112 with a high level of pixelization probably by uniform pixels for a complete macro block.

However, the viewer 26 of the TV 28 is not subject to parental control rules so the obscuring system 104 is not activated. Therefore, the video frames 18 are displayed without pixelization thereby ignoring the pixelization location indicators 108.

Digital video transmission and synchronization systems in the set-top boxes 14 enable the time-stamped metadata of the pixelization location indicators 108 to be processed, and where needed interpolated, without the need for substantial additional CPU demand.

The functions of the system 104 is preferably performed using one or more of the following, with certain modification, as described below: the Headend 12 of FIG. 6; the set-top box 14 of FIG. 7; the recording system 94 of FIG. 8; the non-volatile digital storage medium 98 of FIG. 9; and/or the non-volatile digital storage medium 102 of FIG. 10. It will be appreciated by those ordinarily skilled in the art that the obscuring/pixelization system 104 may be implemented with or without the zoom system 10. If the system 104 and the system 10 are implemented together, it will be appreciated that the digital video stream 16 preferably includes both the zoom location indicators 20 and the pixelization location indicators 108 as described below.

Reference is again made to FIG. 6. Reference is also made to FIG. 11. The Headend 12 also typically includes an obscuring location processor, typically a pixelization processor 120, to preferably prepare the pixelization location indicators 108 in the digital video stream 16. The stream processor 82 is preferably operative to associate the pixelization location indicators 108 and the video frames 18 in the digital video stream 16, such that at least part of the video frames 18 are available to be visually obscured, using pixelization, by the set-top boxes 14 based on the pixelization location indicators 108 during playback of the digital video stream 16.

In substantially the same way that interpolation is performed for the zoom location indicators 20, with reference to FIG. 3, interpolation is typically performed for the pixelization location indicators 108.

Reference is also made to FIG. 4. When the pixelization location indicators 108 and the data of the video frames 18 are located in separate packets 70 in the digital video stream 16, the stream processor 82 is preferably operative to temporally synchronize the pixelization location indicators 108 and the video frames 16.

Reference is again made to FIG. 5, which shows that in accordance with the alternative preferred embodiment of the present invention, the pixelization location indicators 108 are located within the packets 70 of the data of the video frames 18.

Reference is again made to FIG. 7. Reference is also made to FIG. 11. The stream receiver 86 also receives the pixelization location indicators 108 of the digital video stream 16 from the broadcaster. The display processor 88 preferably visually obscures, using pixelization, at least part of the video frames 18 of the digital video stream 16 based on the pixelization location indicators 108 during play of the digital video stream 16.

It should be noted that the display processor 88 is typically only activated to visually obscure the video frames 18 in accordance with one or more parental control rule managed by the parental control 106.

By way of example only, in an MPEG2 set-top box, macro blocks describe tiles within the video 16 and lower level data describes the pixels within the tiles. In order to perform pixelization in accordance with parental control rules, the MPEG2 decoder is instructed to render each MPEG macro block within the center 110 and radius 114 pair as a uniform single color.

The display processor 88 is also preferably operative to interpolate pixelization location indicators 108, as necessary.

When the data of the video frames 18 and the pixelization location indicators 108 are in separate packets 70, the display processor 88 is preferably operative to temporally synchronize the pixelization location indicators 108 and the video frames 18, as described with reference to FIG. 4.

Reference is again made to FIG. 8. The recording system 94 also preferably includes a pixelization location processor 122 to typically prepare the pixelization location indicators 108 in the digital video stream 16 generally including encoding, multiplexing and optionally (but preferably) scrambling.

Reference is again made to FIG. 9. The non-volatile digital storage medium 98 also preferably includes the pixelization location indicators 108. The pixelization location indicators 108 and the data of the video frames 18 are typically located in separate packets 70 in the digital video stream 16. The synchronization elements ($t_1$, by way of example in FIG. 9) are also for synchronizing the pixelization location indicators 108 and the video frames 18 in the digital video stream 16.

Reference is again made to FIG. 10. In accordance with the alternative preferred embodiment of the present invention, the pixelization location indicators 108 are typically included with the packet of the data of the video frames 18 in the non-volatile digital storage medium 102.

It will be understood that the system according to the present invention may be a suitably programmed processor. Likewise, the invention contemplates software being readable by a processor for executing the method of the invention. The invention further contemplates a machine-readable memory tangibly embodying a program of instructions executable by the machine for executing the method of the invention.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination. It will also be appreciated by persons skilled in the art that the present invention is not limited by what has been particularly shown and described hereinabove. Rather the scope of the invention is defined only by the claims which follow.

What is claimed is:

1. A content consumer system for zooming a digital video stream provided by a content provider, the provided digital video stream including a plurality of video frames and a plurality of zoom location indicators, each of the zoom location indicators including an element being indicative of at least one horizontal position and at least one vertical position in the video frames, the system comprising:
    a stream receiver to receive the video frames and the zoom location indicators of the digital video stream from the content provider; and
    a display processor to zoom the video frames of the digital video stream based on the zoom location indicators while playing the digital video stream,
    wherein the magnitude of the zoom is determined by a user of the content consumer system.

2. The system according to claim 1, wherein the video frames include:
    a first video frame associated with a first zoom location indicator of the zoom location indicators; and
    a second video frame associated with a second zoom location indicator of the zoom location indicators; and
    at least one intervening video frame temporally located between the first video frame and the second video frame, the display processor being operative to interpolate between the first zoom location indicator and the second zoom location indicator in order to determine an interpolated zoom location indicator for the at least one intervening frame.

3. The system according to claim 1, wherein the element of each of the zoom location indicators is indicative of a center of a target area.

4. The system according to claim 3, wherein each of the zoom location indicators includes a length indicative of a magnitude of the target area.

5. The system according to claim 1, wherein the video frames include data, the zoom location indicators and the data of the video frames being located in separate packets in the digital video stream.

6. The system according to claim 5, wherein the display processor is operative to temporally synchronize the zoom location indicators and the video frames.

7. The system according to claim 1, wherein the video frames include data within a plurality of packets, the zoom location indicators being located within the packets of the data of the video frames.

8. A method for zooming a digital video stream provided by a content provider, the provided digital video stream including a plurality of video frames and a plurality of zoom location indicators, each of the zoom location indicators including an element being indicative of at least one horizontal position and at least one vertical position in the video frames, the method comprising:
    a content consumer system receiving the video frames and the zoom location indicators of the video stream from the content provider; and
    the content consumer system zooming the video frames of the digital video stream based on the zoom location indicators while playing the digital video stream,
    wherein the magnitude of the zooming is determined by a user.

9. A content consumer system for zooming a digital video stream provided by a content provider, the provided digital video stream including a plurality of video frames and a plurality of zoom location indicators, each of the zoom location indicators including an element being indicative of at least one horizontal position and at least one vertical position in the video frames, the system comprising:
    means for receiving the video frames and the zoom location indicators of the digital video stream from the content provider; and
    means for zooming the video frames of the digital video stream based on the zoom location indicators while playing the digital video stream,
    wherein the magnitude of the zoom is determined by a user of the content consumer system.

* * * * *

UNITED STATES PATENT AND TRADEMARK OFFICE
Certificate

Patent No. 7,782,344 B2                          Patented: August 24, 2010

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: David Whittaker, Hertfordshire (GB); and Rob Davis, Ramat Beit Shemesh, (IL).

Signed and Sealed this Seventh Day of February 2012.

*KEE M. TUNG*
*Supervisory Patent Examiner*
*Art Unit 2628*
*Technology Center 2600*